US008075234B2

(12) United States Patent
McClure

(10) Patent No.: US 8,075,234 B2
(45) Date of Patent: Dec. 13, 2011

(54) EXPANDABLE COLLET ANCHOR SYSTEM AND METHOD

(76) Inventor: Travis D. McClure, Kirkland, WA (US)

( * ) Notice: Subject to any disclaimer, the term of this patent is extended or adjusted under 35 U.S.C. 154(b) by 0 days.

(21) Appl. No.: 10/964,119

(22) Filed: Oct. 12, 2004

(65) Prior Publication Data

US 2005/0169726 A1    Aug. 4, 2005

Related U.S. Application Data

(63) Continuation of application No. PCT/US03/02925, filed on Jan. 31, 2003.

(60) Provisional application No. 60/357,292, filed on Feb. 15, 2002.

(51) Int. Cl.
*F16B 13/06* (2006.01)
(52) U.S. Cl. ............................. 411/71; 411/55
(58) Field of Classification Search .................. 411/175, 411/531, 546, 503, 502, 21, 41, 45, 46, 48, 411/69, 59–61, 71, 74, 49–53, 55, 193, 198, 411/913, 202
See application file for complete search history.

(56) References Cited

U.S. PATENT DOCUMENTS

| | | | | |
|---|---|---|---|---|
| 2,379,786 A | * | 7/1945 | Bugg et al. | 411/80.6 |
| 2,379,788 A | | 7/1945 | Bugg | |
| 2,409,352 A | * | 10/1946 | Gill | 411/38 |
| 2,649,884 A | * | 8/1953 | Westover | 411/173 |
| 2,936,015 A | * | 5/1960 | Rapata | 411/182 |
| 3,269,251 A | * | 8/1966 | Bass | 411/21 |
| 3,469,493 A | * | 9/1969 | Fisher | 411/71 |
| 4,405,272 A | * | 9/1983 | Wollar | 411/41 |
| 5,065,490 A | * | 11/1991 | Wivagg et al. | 29/402.17 |
| 5,106,225 A | * | 4/1992 | Andre et al. | 403/408.1 |
| 5,259,689 A | * | 11/1993 | Arand et al. | 403/337 |
| 5,599,148 A | * | 2/1997 | Hirose | 411/175 |

(Continued)

FOREIGN PATENT DOCUMENTS

GB      1 548 964 A     7/1979

(Continued)

OTHER PUBLICATIONS

International Search Report dated Sep. 23, 2003 re PCT application No. PCT/US03/02925.

(Continued)

*Primary Examiner* — Gary Estremsky
(74) *Attorney, Agent, or Firm* — Sound Intellecutal Property PLLC; Stephen M. Evans

(57) ABSTRACT

An expandable collet body and anchor system incorporating a collet body anti-rotation feature and preferably collet body translation arresting means are disclosed. The collet body includes a first end, a first wall portion having at least two fingers, a second end including a head, a second wall portion, an annular protrusion and anti-rotation means where the anti-rotation means engages with an auxiliary structure defining a hole having an internal surface adapted to translationally accept the collet body and operatively function with the collet body anti-rotation means. The auxiliary may include a work piece to be optionally joined to another structure or a sleeve insert locatable in a hole defined by a work piece. Because the collet body is relatively free to translate within the auxiliary structure, a wide spectrum of work piece depths can be engaged with a single length collet body with the use of a stud to radially expand the fingers, thereby engaging a distal structure.

11 Claims, 6 Drawing Sheets

U.S. PATENT DOCUMENTS

| | | | |
|---|---|---|---|
| 5,704,752 A * | 1/1998 | Logerot | 411/503 |
| 6,287,044 B1 * | 9/2001 | Huber | 403/297 |
| 6,712,573 B1 * | 3/2004 | Huber | 411/71 |
| 6,896,460 B2 * | 5/2005 | Enomoto et al. | 411/41 |

FOREIGN PATENT DOCUMENTS

| | | |
|---|---|---|
| JP | 49-058956 | 5/1974 |
| JP | 04-128473 | 4/1992 |
| JP | 11-051018 | 2/1999 |
| JP | 2000-230521 | 8/2000 |

OTHER PUBLICATIONS

European Search Report dated Mar. 13, 2006 re EPO application No. 32157.GJHPEP/EP.

English translation of Office Action dated Jun. 3, 2008 from Japanese Patent Application No. 2003-568949.

* cited by examiner

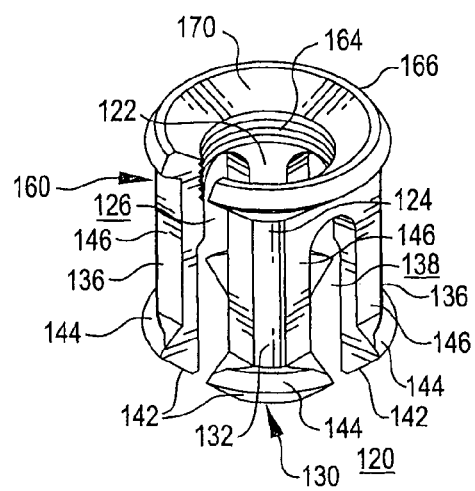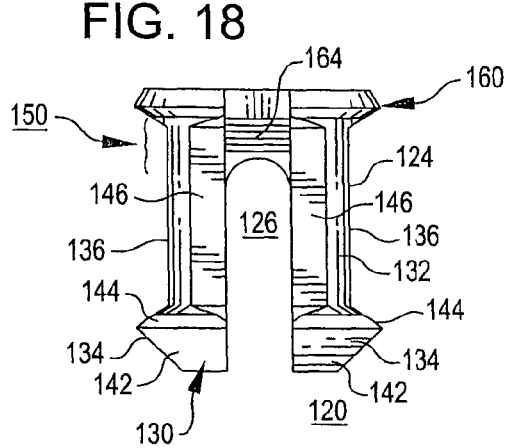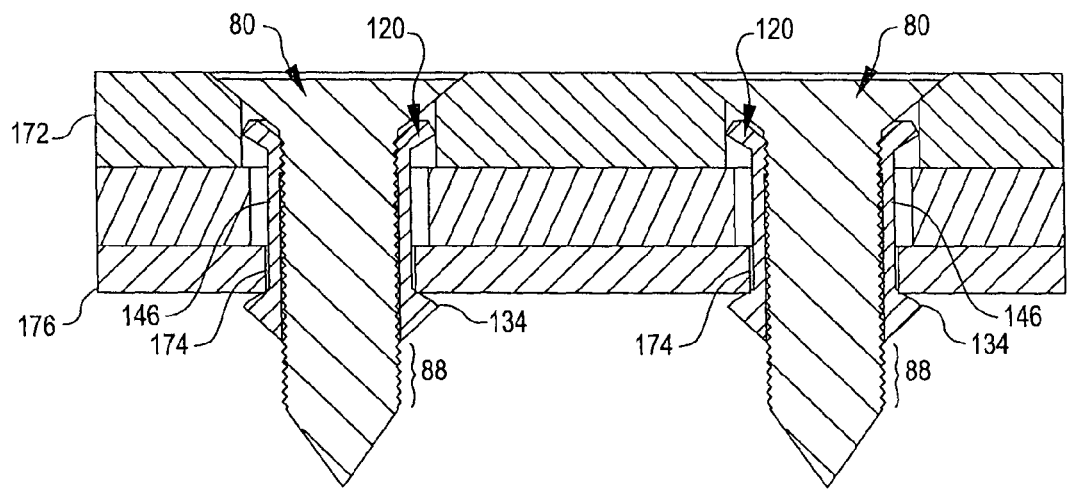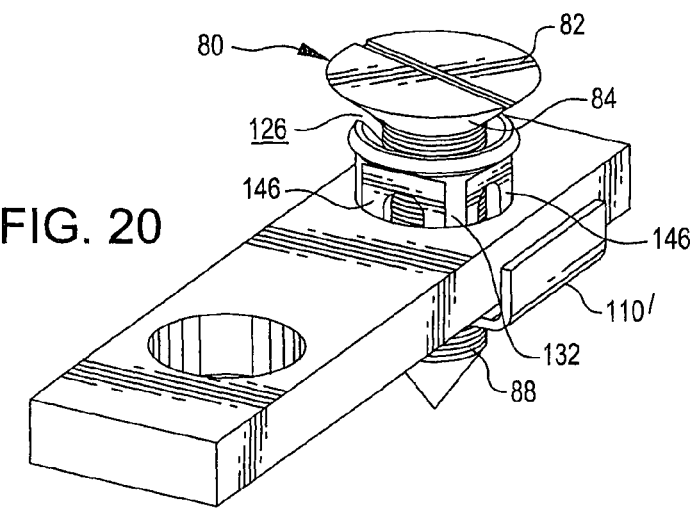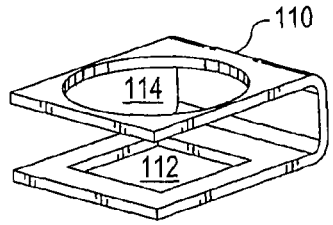

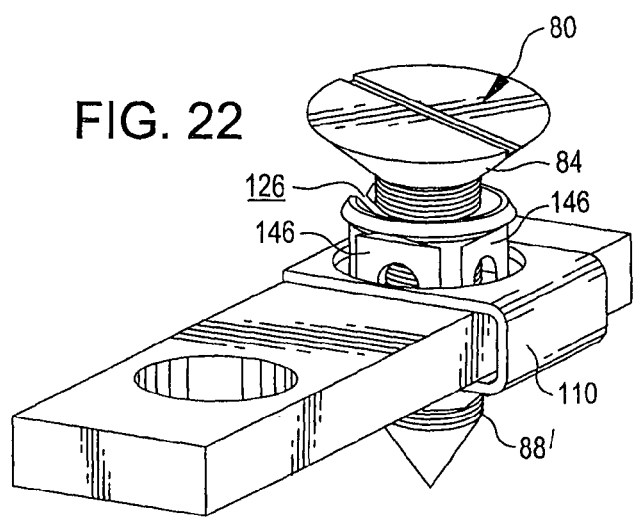
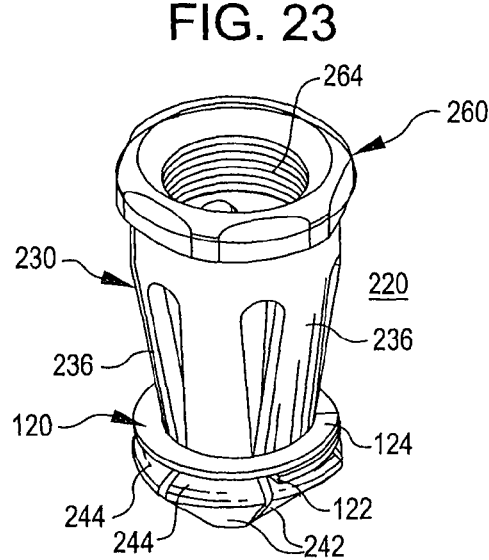
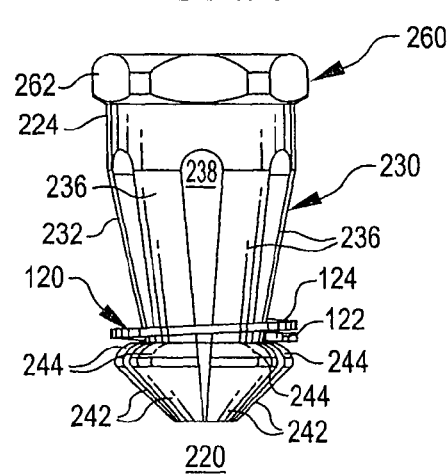
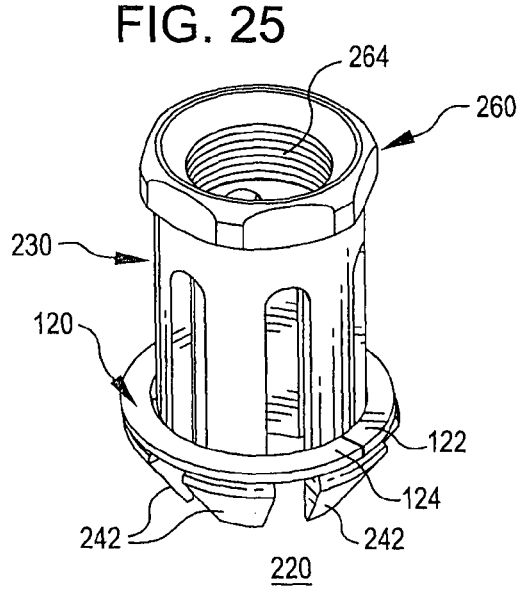
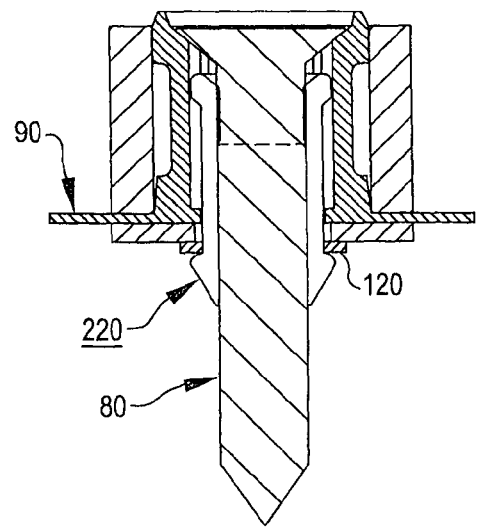

EXPANDABLE COLLET ANCHOR SYSTEM AND METHOD

CROSS-REFERENCE TO RELATED APPLICATION

This is a continuation co-pending International Application PCT/US2003/002925, filed on 31 Jan. 2003, designating the United States, which is incorporated herein by reference, which claims priority from U.S. patent application No. 60/357,292 filed 15 Feb. 2002. Benefit of the filing date of PCT/US2003/002925 under 35 USC §120 and priority to U.S. 60/357,292 is claimed.

Priority to and benefit of co-pending PCT application number PCT/US03/02925 filed 31 Jan. 2003, which claims priority to U.S. provisional application No. 60/357,292, is hereby claimed.

BACKGROUND OF THE INVENTION

In the field of non-permanent floor panel attachment, a nut and bolt combination has almost always been employed. A simple method involves directly passing a threaded bolt (or stud) through the front side of a passageway between the floor panel and underlying structure, and attaching a likewise threaded nut located on the backside of the passage to the bolt (stud) (in the case of a threaded stud, nuts are positioned at the front and backside of the passage to engage with the stud). Torque is then applied to the nut(s) with respect to the bolt (stud) in order to tighten the floor panel to the underlying structure.

A more sophisticated installation uses a potted-in insert installed in an enlarged passageway in the floor panel, the insert having an internal passageway that cooperatively receives a stud or bolt in general—a countersunk headed machine screw being preferred. This is particularly useful when the floor panels are made up of a honeycombed composite material that is easily distorted via torque and compression, and the insert is bonded to said material. Usual installation involves an insert with topside that resides near the front side of the passageway, and a bottom side that has an enlarged bonding flange and resides near the interface between the floor panel and the underlying structure. The topside of the insert is either swaged or not swaged to form fit the front side of the floor panel, and the enlarged bonding flange has a bonding surface that facilitates the bonding of the insert to the floor panel. However, any combination of bonding flanges and swaging operations may be used to install the insert into the floor panels, including a two-piece insert that has two bonding surfaces, one on each face of the floor panel.

An even more elaborate and industry preferred method for attaching floor panels to underlying structure involves using the aforementioned potted-in insert, the insert being installed in a honeycomb or similar floor panel; attaching a nut-plate element to the backside of the passageway in the underlying structure; and a countersunk headed screw being inserted through the passage way in the insert, and being torqued with respect to the nut-plate element, the nut-plate element being held by various methods to the underlying structure. Said torque rotates the countersunk screw with respect to the nut-plate element, thus causing subsequent tightening of the floor panel to the underlying structure.

The nut element of the prior art has many variations, two of the more popular being a nut-plate and a clip-nut. The nut-plate variation has a nut element being captured in a formed plate—said nut is captured such that it is centrally located over a center hole in the plate and offers small lateral misalignments. In addition, the plate which holds the nut element also has a least two additional holes located near the edges of the plate to serve as attachment points to the structure; the entire nut-plate being riveted through those holes to the underlying structure with the center hole located in line with the passageway in the underlying structure.

The clip-nut variation of the nut-plate element has a nut being captured or formed in a "U" shaped plate. The opening of the "U" shaped plate is sized to match the structure it is mounted on and the nut element is placed to be in line with the structure. The nut is captured and held tightly on the bottom outer portion of the "U" shape by a formed return tab. The return tab is structured so the nut is held in alignment over the through hole or passageway, and held from rotating with respect to the plate element.

Current manufacturing methods in the aerospace industry commonly use nut-plates and clip-on nut-plates to fasten panels to underlying structure, as described above. However, these existing methods often are accompanied by substantial detrimental consequences that result in costly reworks and delays.

In the existing manufacturing process, riveted-on nut-plates can be used in places where clip-on nut-plates do not have adequate throat depth to span the distance between the passageway and the edge of the underlying structure. However, the installation of riveted on nut-plates is time consuming and requires expensive specialized equipment. One installation can typically take 15 minutes to complete as specialized equipment must drill the main center hole in the underlying structure plus two additional smaller holes through which rivets are installed. Both rivets act as a torque reacting element and hold the nut-plate to the structure when not engaged in fastening. The nut-plate must then be riveted to the underlying structure using still more specialized equipment. Special care must be taken during this process not to misalign or mis-locate the rivets or the rivet holes as such misalignment can result in a variety of problems, e.g., replacement of the entire structure, an extremely expensive process.

In addition to the foregoing, the lateral float of a riveted nut-plate can be eliminated in later coating processes commonly used to prevent corrosion. In effect, the nut can be frozen in an out of alignment condition by sealants or corrosion resistant coatings, thus preventing the bolt from engaging the nut element during subsequent torquing operations.

Clip-on nut-plates are preferred over the riveted-on variety, as they do not require specialized equipment and processes. As described above, they are simply installed sideways onto the structure—the open end of the "U" shape is bent together to form a type of spring with clamping force and is inserted laterally onto the structure so that the structure is sandwiched between the top and bottom of the "U" element. The closed side of the "U" element serves as the torque reacting feature. The slightly bent "U"—now open after insertion over the structural element—provides a slight spring like clamping to hold it in position when not engaged. The top of the "U" portion has a bent down locator tab, which axial locates the clip-on nut-plate to the hole in the structure. This locator tab is usually undersized, thus allowing the nut-plate to move laterally within the range determined by the size difference between the hole in the structure and the locator tab.

Unfortunately, the locator tab has a sharp edge that scratches the surface of the underlying structure every time a clip nut is removed or installed, even when the underlying structure is treated with anti-corrosion coatings. The associated scratches resulting from clip nut installation and removal provide corrosion starting points. In addition, the back of the "U"-shape, which acts as a torque reactor, nicks and rubs against the underlying structure, further providing corrosion starting points.

It is also important to note that while each nut-plate design has unique problems associated with their use, they also share common disadvantages as described below. Both designs utilize thread-locking devices, which are required to provide a certain level of resistance to vibration forces that tend to loosen fasteners over a period of time during the operation of the aircraft. These thread locking devices are most commonly mechanical in nature and constitute mechanically deforming the nut. The purpose of the thread distortion is to providing a continuous preload on the threads to resist vibration. Therefore, additional torque must be applied to overcome the thread-locking feature while applying the specified clamping force.

It is also difficult to control the accuracy of the thread-locking measures. Sometimes the deformation is too extreme, causing a stud to freeze within the nut upon installation. Other times, the deformation is inadequate, and the fastener vibrates loose over time.

Another major disadvantage of these types of nut-plates share is that they require access to both sides of the structure—they are not true blind side fasteners. For instance, if an individual nut element is damaged or faulty (too much distortion on the thread-locking devices) and must be replaced during installation of a floor panel, the entire floor panel and all subsequently installed studs must be removed in order to gain access to the faulty nut-plate. Also, additional labor is required to install each nut-plate, then place the floor panel into position, then attach and torque the studs into position.

Finally, the current nut-plate designs have some alignment difficulties. The nut element is not designed to find the installation center of the stud. The limitation sometimes results in damaging the threads on either the nut element or the stud—cross threading.

SUMMARY OF THE INVENTION

The invention relates to a blind side fastening system, components thereof, and methods for making and using the same. Generally stated, an expandable collet anchor system incorporating the invention includes means for fastening at least two objects, each having a generally circular aperture, together to form a structural or a non-structural attachment.

In any blind side fastening system regardless of the embodiment, a collet body is used. The collet body, which defines a longitudinal axis, comprises a first end defining a generally circular opening and a second end defining a generally circular opening. Adjacent to the first end is a first wall portion having an inner surface, an outer surface, a progressing radial profile and defining at least two secondary slots extending longitudinally from the first end to thereby create at least two radially flexible fingers. Adjacent to the second end is a second wall portion having an inner surface, an outer surface, and a progressing radial profile. As used herein, the term "progressing radial profile" means a series of radius measurements taken along a segment of the collet body axis to the relevant wall outer periphery. The profile may be progressively increasing, decreasing, constant, or various combinations of the above, as determined from the beginning point of the profile.

In addition to the foregoing, an annular protrusion of various geometric cross sections extends from the first wall portion. Separating the two wall portions may be a mid body portion, which may be nominal or may involve a radial transition. The collet body may optionally define a primary slot extending from the first end and preferably (although not necessarily) to the second end. The primary slot may be parallel to the collet body axis, linear but skew to the axis or helical, depending upon the embodiment.

In operation, the collet body is inserted first end first into the aligned apertures of the at least two objects. For purposes of this patent, the object first encountered by the inserting collet body is defined as the proximal object and the object last encountered by the inserting collet body is defined as the distal object. Insertion continues until the annular protrusion of the first wall portion clears the distal object and the second end is in contact with or linked via an intermediate structure to the proximal object.

In one series of embodiments, the fingers are in a nominal state, i.e., the progressing radial profile of the first wall portion is either constant or increasing (diverging) with respect to the first end (it is possible that a decreasing progressive radial profile can be employed, however the degree of subsequent convergence during insertion is then more limited). In these embodiments, the fingers undergo a temporary convergence in order for the annular protrusion to clear the distal object aperture. After so doing and depending upon the material used to form the fingers, they may return to their initial state (a memory material is chosen). In such instances, the annular protrusion will prevent removal of the collet body unless at least some of the fingers are brought back to a non-diverged or converging state, or the nature of the annular protrusion facilitates such an action, e.g., the annular protrusion includes a distal object facing slope. If the at least two fingers do not return to their initial state (a malleable material is chosen), then a stud as described below will be useful to complete the fastening objective.

In another series of embodiments, the fingers are in a converging state, i.e., the progressing radial profile of the first wall portion is decreasing towards the first end. In these embodiments, when the annular protrusion clears the distal object aperture after insertion, the fingers are radially expanded, for example, by insertion of a stud as described below. Again, the fingers may or may not return to their initial state after initial radial expansion without the assistance of a stud or other insert.

As intimated above, the nature of the collet body material affects its performance. While the collet body can be formed from a myriad of materials, any such materials will have memory properties, malleable properties, or a combination of the two. A memory material will permit temporary distortion of the collet body fingers until the distorting force has been removed, where after the affected portions will return to their initial state or as close to the initial state as possible. Suitable memory materials include spring steel, plastics, composites, and the like. A malleable material will cause a distortion resulting from the application of at least one force to permanently alter the physical state of the affected collet body portion. Suitable malleable materials include steel, aluminum, titanium, and the like. A combination material will exhibit a hybrid response, the nature of which depends largely upon the composition of the material. The intended application for the collet body will generally determine the most desirable composition.

In selected system embodiments, a stud and/or a sleeve insert may also be used to fasten two pieces together from only one side. The stud is sized to substantially fit within the internal diameter of the second wall portion (as used herein, the term "substantially fit" includes stud diameters that are larger than the internal diameter of the second wall portion but may be accommodated by the collet body due to its ability to radially expand when a primary slot transverses the second wall portion). When inserted in the collet body, the stud may cause the fingers to radially expand.

In certain embodiments, the stud may be continuously threaded, in which case it is preferable to have complementary internal threads formed in at least a portion of the collet body. The threads may be located at any wall portion, the purpose being to secure the stud in the collet while permitting rotation of the stud into the collet.

In other embodiments, the stud may have discontinuous threads, e.g., buttress threads. In such an embodiment, it may or may not be desired to have complementary threads formed in the collet body, since the purpose of such threads is to prevent the stud from being easily removed from the collet body.

In selected embodiments, the collet body also comprises anti-rotation means for preventing the rotation of the collet body when subjected to torque, such as when a threaded member or stud engages a portion of the collet body inner wall(s). The anti-rotation structure is intended to engage a mechanical ground, which may be the proximal object or may be an ancillary piece such as sleeve insert affixed to one of the items to be fastened.

A variety of means are available for counteracting induced rotation of the collet body. Presuming a closely matched collet body and insertion aperture (whether as determined by the part aperture or by an auxiliary structure such as a sleeve insert), one series of embodiments relies upon the incorporation of a non-circular cross section portion of the collet body. A simple illustration of this form is a key and slot arrangement where the key may be present on a portion of the collet and the slot formed in the piece to be attached (or an auxiliary structure such as a sleeve insert), or vice versa. Naturally, a plurality of keys and slots may be used. The geometric cross-section of the key may be rectilinear, curvilinear or polygonal. Moreover, while it is preferable that the insertion aperture be complementary in geometry to the key arrangement, it is only necessary that the insertion aperture rotationally interfere with the key arrangement. Thus, for example, there may be only one key feature present on the collet, but several slots formed in the insertion aperture. So long as the one key feature operates to prevent collet body rotation, it is considered a suitable anti-rotation means.

As described above, the system may also utilize a sleeve insert, which preferably comprises an annular base and a cylinder preferably including a rim portion extending therefrom, although in certain embodiments the annular base can be omitted. The purpose of the insert is to provide a means for facilitating the attachment of the two objects. A first feature of the insert is to provide a means for stopping translation of the stud beyond the boundaries of the proximal object; the stud head directly or indirectly co-acts against the sleeve, which does not extend into the distal object aperture. To do this, a stud head seat is positioned along the inner surface of the sleeve insert, and preferably at or near the rim portion through which the collet body and stud are inserted. A second feature of the insert is to provide a mechanical base so as to counteract the torque generated by the collet body when a threaded stud is being used. To do this, the sleeve insert includes an anti-rotation feature, i.e., a key, square, hex, etc. while the collet body includes a complementary arrangement, and the sleeve insert is fixedly attached at least to one of the objects so that the sleeve insert creates an extension of that mechanical base. A third feature of the insert provides for an outer flange portion at the rim of the sleeve insert, particularly when the annular base is omitted. In such an embodiment, the stud bears upon the sleeve insert, which by way of the outer flange portion bears upon the object. Some or all of these features are especially beneficial when one or both objects are relatively fragile, e.g., subject to point load crushing.

BRIEF DESCRIPTION OF THE DRAWINGS

FIG. 17 is a perspective view of a third embodiment of a collet body having one part of a two part anti-rotation means wherein the fingers are shown in a nominal or constant radial profile state;

FIG. 18 is an elevation view of the third embodiment of the collet body shown in FIG. 17;

FIG. 19 is a cross sectional elevation view of the third collet body embodiment of FIG. 17 when compressively attaching at least two panels using a threaded stud, where one of the panels has one part of a two part anti-rotation means in the form of an aperture perimeter similar to the outer surface geometry of the third collet embodiment, thus establishing an anti-rotation means;

FIG. 20 is a perspective view of a first clip embodiment that supplies one part of a two part anti-rotation means in the form of an aperture perimeter similar to the outer surface geometry of the third collet embodiment;

FIG. 21 is a perspective view of a second clip embodiment that supplies one part of a two part anti-rotation means in the form of an aperture perimeter similar to the outer surface geometry of the third collet embodiment;

FIG. 22 is a perspective view of the clip of FIG. 21 when used in conjunction with the third collet body of FIG. 17 and a stud;

FIG. 23 illustrates in perspective the collet body of FIG. 8 used in conjunction with a split lock washer that has been collapsed to have an external diameter less than the collet body faceted head;

FIG. 24 is an elevation view of the collet body and lock washer combination of FIG. 23;

FIG. 25 shows the collet body and lock washer combination of FIG. 23 in perspective wherein the collet body and lock washer have been expanded; and FIG. 26 is a cross sectional elevation of the collet body and lock washer combination of FIG. 25 illustrating the structure when attaching a panel to a sub-structure using a threaded stud.

DETAILED DESCRIPTION OF THE SEVERAL EMBODIMENTS

Figure 5:
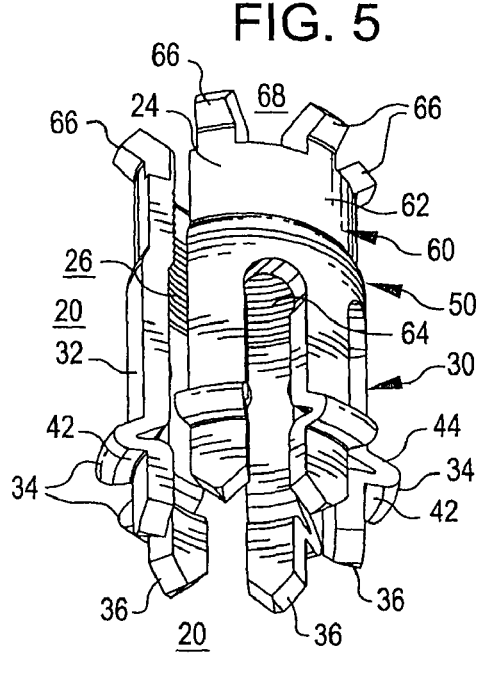
FIG. 5 is a perspective view of a first embodiment of a collet body wherein the fingers are shown in a nominal or constant radial profile state.
Figure 6:
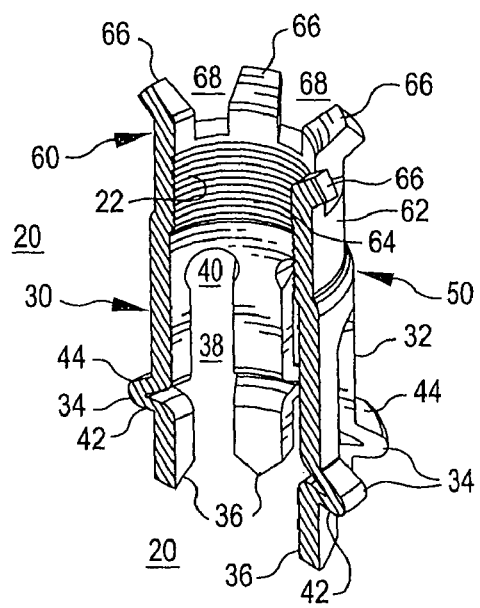
FIG. 6 is a perspective view of the embodiment of FIG. 5 shown in cross section.
Figure 7:
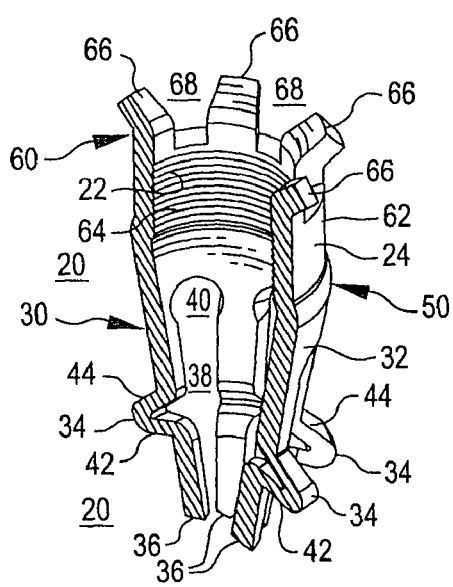
FIG. 7 is a perspective view of the embodiment of FIGS. 5 and 6 shown in a perspective cross section, and wherein the fingers are shown in a converging or progressingly decreasing radial profile state.
Figure 8:
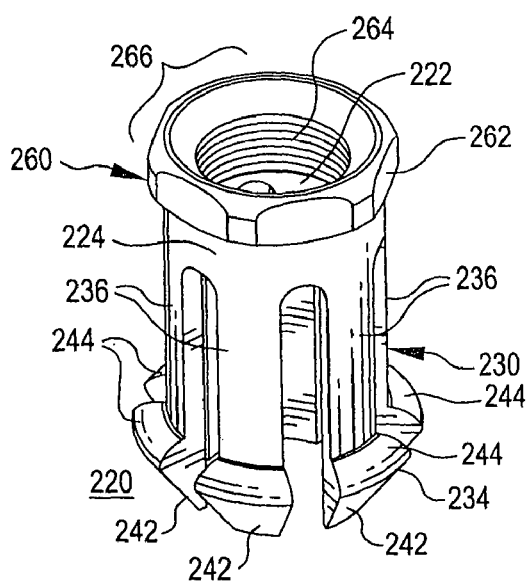
FIG. 8 is a perspective view of a second embodiment of a collet body wherein the fingers are shown in a nominal or constant radial profile state.
Figure 9:
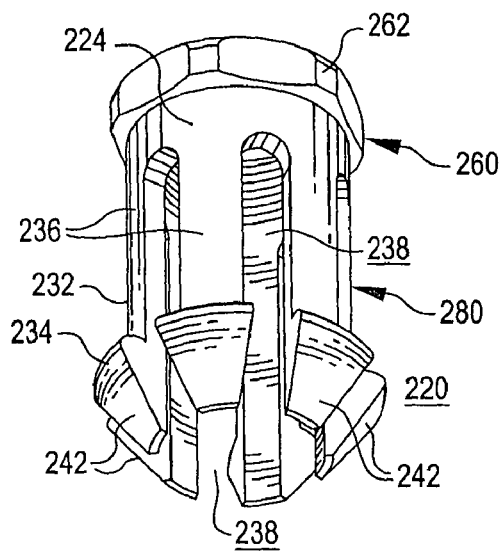
FIG. 9 is an alternative perspective view of the second embodiment.

Turning then to the several Figures wherein like numerals indicate like parts, and more particularly to FIGS. 5-7, a first embodiment of a collet body is shown. Unless otherwise noted, any described collet body or collet system is intended to secure at least two objects together, i.e., fasten at least two objects together, each having a generally circular aperture, to form a single attachment. An exception to this premise relates to FIGS. 17-22 wherein a rectilinear aperture is preferred and FIGS. 23-26 wherein a stud is fixedly attached to one object and operates to anchor a second object thereto.

Returning then to FIGS. 5-7, collet body 20 can be formed from any material suitable for its intended application including metals, polymers, and composites. In the illustrated embodiment, collet body 20 is formed from metal and comprises the following portions and elements: first end 30; first wall portion 32, which includes protruding portion 34 and defines fingers 36; mid body portion 50; and second end 60, which includes second wall portion 62 and flared hex 66. Collet body 20 also defines primary slot 26, which extends from inner surface 22 to outer surface 24 of collet body 20. Primary slot 26 permits collet body 20 to undergo selective radial expansion and contraction as determined by the nature of the material used to construct collet body 20, the effective wall thickness(es), and other factors known to those persons skilled in the art.

Turning specifically to first wall portion 32, each finger 36 is separated by a secondary slot 38, which includes a stress relief feature 40. Depending upon design considerations, the number of fingers 36 can range from 2 to many, with 6 being shown in the illustrated embodiment. The length of fingers 36 is also a design consideration. The purpose of protruding portion 34 as will be discussed in more detail below is to act as a flange or axial translation obstruction element against a distal object.

Second wall portion 62, which is separated from first wall portion 32 by mid body portion 50, is shown as having a reduced internal diameter compared to the diameter of first wall portion 32, although a reduced diameter is not necessary to the functioning of the collet body. Second wall portion 62 also defines flared hex 66. Flared hex or tabs 66 are in turn separated by tertiary slots 68. As will be described in more detail below, the purpose of flared hex 66 is to act as an anti-rotation element in some instances, and/or as a flange against the proximal object in other instances.

Figure 1:
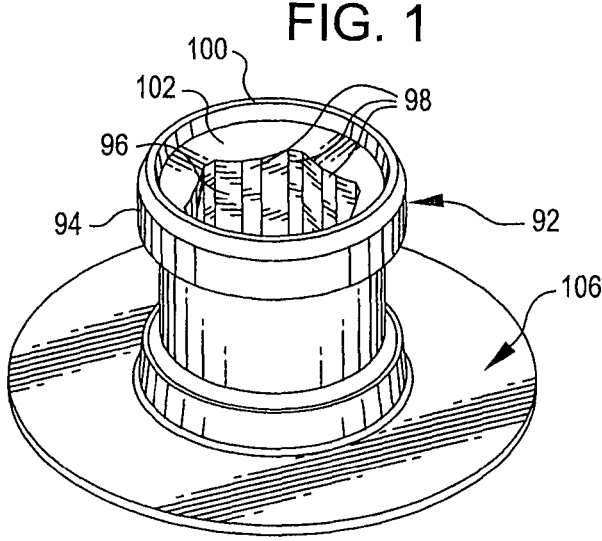
FIG. 1 is a perspective view of a sleeve insert.
Figure 2:
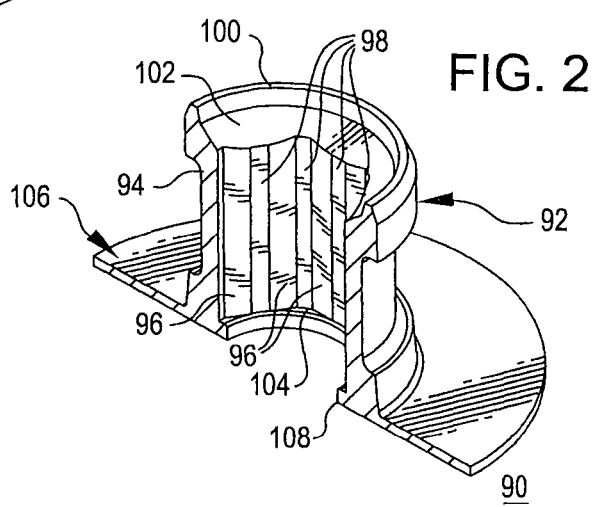
FIG. 2 is a perspective view of the embodiment shown in FIG. 1 in cross section, particularly illustrating features of the cylinder inner surface.
Figure 3:
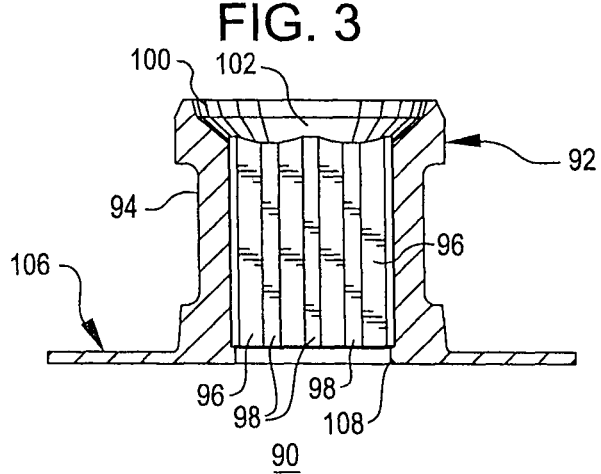
FIG. 3 is an elevation view in cross section of the embodiment shown in FIGS. 1 and 2.

In many of the illustrated embodiments, an additional structure is used to facilitate both arrestment of collet body rotation and axial translation thereof. Several such additional structures are shown in FIGS. 1-4 as sleeve inserts 90 and 90'. Sleeve insert 90 is best shown in FIGS. 1-3, and is comprised of two main elements, namely, cylinder 92 and base 106. As with collet body 20, sleeve insert 90 can be constructed from any material suitable for its intended application including metals, polymers, and composites. In preferred form, it is constructed as a unitary piece, although its performance will not be substantially affected if constructed from elements suitably attached to one another.

Cylinder 92 has outer surface 94 and inner surface 96, which in turn defines longitudinal grooves 98, and rim or ledge 104. Cylinder 92 further defines a bevel or taper 102 adjacent to or integral with upper lip 100, which may act as a seat for a complementary taper of stud 80 (see, for example, FIGS. 13-16), and lower lip 108. As will be described below, the geometry of inner surface 96 is intended to interact with selected elements of second end 60 of any given collet body. Thus in the illustrated embodiment, longitudinal grooves 98, which extend from bevel or taper 102 to rim or ledge 104, interact with flared hex 66 to permit longitudinal translation of collet body 20 within cylinder 90, but prevent rotation of collet body 20 within cylinder 90. Advantageously, rim or ledge 104 prevents collet body 20 from wholly extending beyond lower lip 108 via its interaction with flared hex 66.

Figure 4:
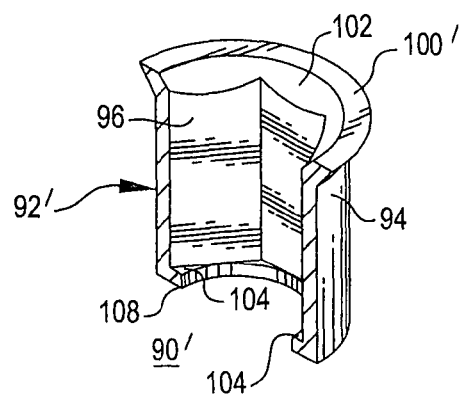
FIG. 4 is an alternative embodiment of the sleeve insert wherein an upper rim has a radially extending flange for engaging an object surface.

The preceding sleeve insert is designed to be mechanically and/or chemically attached to a proximal object. However, should a user not have access to the bottom surface of the proximal object, then sleeve insert 90' may be used, as illustrated in FIG. 4. As shown, upper lip 100' has a flanged or flared profile that prevents over-insertion, and base 106 is not present. A user need only adhere sleeve insert 90' into the aperture of a proximal object, lower lip 108 first, where after upper lip 100' compressively contacts the upper surface of the proximal object. This interaction is shown in detail in FIGS. 15 and 16.

Turning then to FIGS. 13-16, stud 80 includes head 82 having bevel or taper feature 84, and shaft 86 having one or more threads 88 formed thereon. Depending upon design considerations, the threads may be continuous (single, double or triple) or may be discontinuous (e.g., buttress threads). If the threads are continuous, then it is preferable that internal threads 64 of inner surface 22 are complementary thereto. If the threads are discontinuous, inner surface 22 may or may not have other than a smooth surface, depending upon design considerations.

Figure 13:
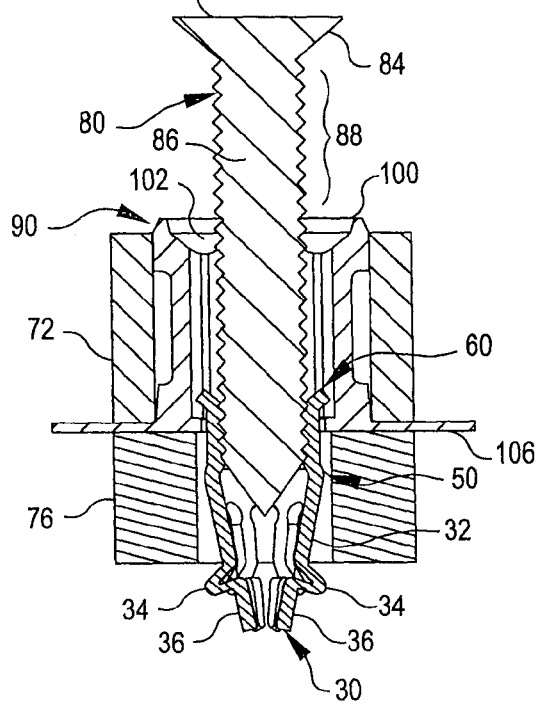
FIG. 13 is a cross sectional elevation view of the first collet body embodiment of FIG. 5 used in conjunction with the sleeve insert of FIG. 1 when compressively attaching two thick panels using a threaded stud.
Figure 14:
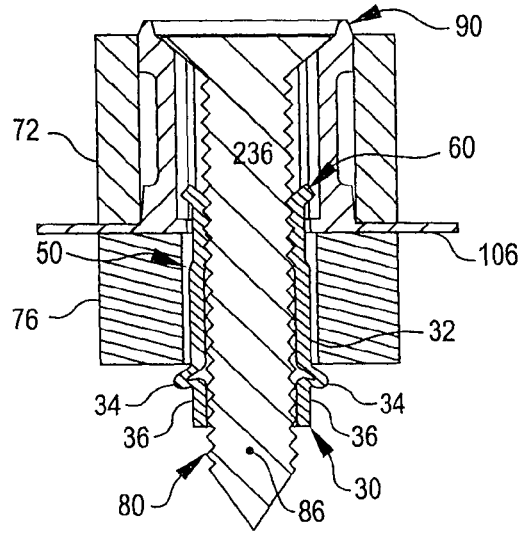
FIG. 14 shows the system of FIG. 13 after rotational engagement of the stud with the collet body and radial expansion of the collet body fingers.
Figure 15:
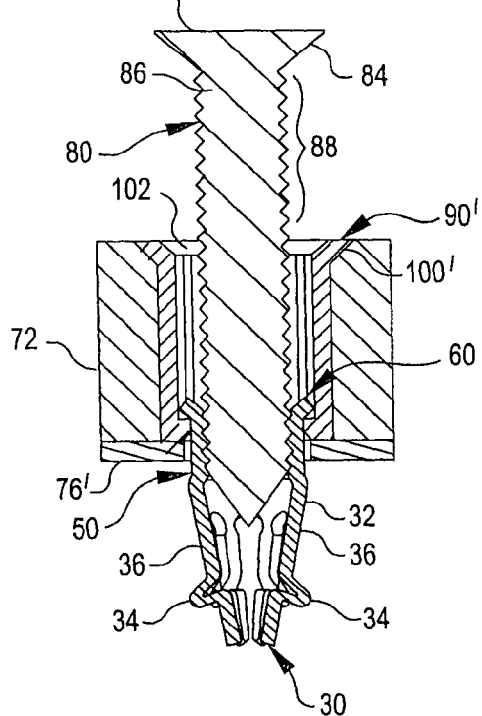
FIG. 15 is a cross sectional elevation view of the first collet body embodiment of FIG. 5 used in conjunction with the sleeve insert of FIG. 1 when compressively attaching a thick panel to a thin panel using a threaded stud.
Figure 16:
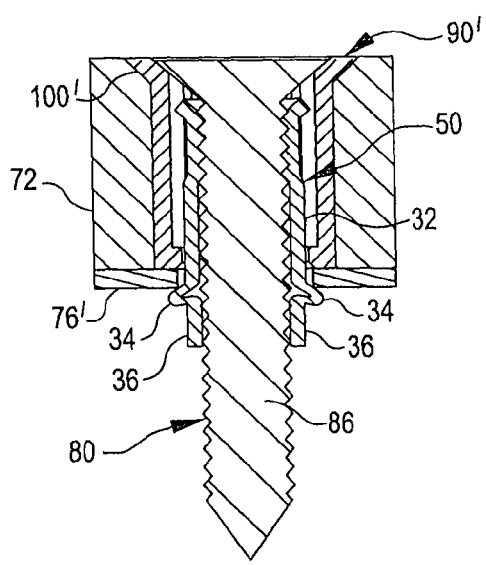
FIG. 16 shows the system of FIG. 15 after rotational engagement of the stud with the collet body and radial expansion of the collet body fingers.

Continuing with reference to FIGS. 13-16, the interaction of the previously described components is shown in reference to proximal panel 72, and thick distal panel 76 and thin distal panel 76'. In FIGS. 13 and 14, sleeve insert 90 is secured to proximal panel 72 such as by adhering base 106 to the bottom surface of proximal panel 72 and the panel apertures are aligned. In FIGS. 15 and 16, sleeve insert 90' is secured in the aperture of panel 72 such as by adhering outer surface 94 to the aperture of distal panel 76'. Alternatively, but not shown, outer surface 94 can include a plurality of radially extending elements, such as knurling or vanes, that physically engage with a distal panel. Collet body 20 is then inserted into insert sleeve 90 or 90', and at least the portion of first wall portion 32 having protruding portion 34 is urged to pass through the aperture of panel 76 or 76'.

As demonstrated in FIG. 15, the fact that all of first wall portion 32 or even mid body portion 50 also passes through the aperture of distal panel 76 does not reduce the functionality of the illustrated embodiment. Specifically referring to FIGS. 13 and 15, simultaneously with or temporally after insertion of collet body 20, stud 80 is inserted into second end 60 so that threads 88 engage complementary internal threads 64 (see FIG. 6). Upon the application of torque, stud 80 translates towards first end 30, thereby causing the radial expansion of converging fingers 36 as is shown in FIGS. 14 and 16. The collet body is prevented from rotating in response to the application of torque via the rotating stud by the physical interaction between the collet body flared hex and the grooves of insert sleeve 90.

As shown in FIGS. 14 and 16, stud 80 will continue translating towards and past first end 30 until protruding portion 34 contacts the exposed surface of distal panel 76 or 76'. Because "upward" movement of the collet body has been arrested by the interaction between protruding portion 34 and the exposed surface of distal panel 76 or 76', stud 80 will then translate "downward." As those persons skilled in the art will appreciate, it is equally plausible that the order of progression could be reversed: if stud 80 were axially driven "downward" before or during rotation so that bevel surface 84 contacts bevel or taper 102, then translation of the collet body "upward" would next occur. The result is that collet body 20 will translate towards upper lip 100 or 100' of sleeve insert 90 or 90', respectively. Under any progression, the result is that bevel surface 84 will contact bevel or taper 102 of cylinder 92 and protruding portion 34 will contact the exposed surface of distal panel 76 or 76'. Because both panels are now in compression, further rotation of stud 80 will cause greater compression of these panels.

An alternative embodiment of the collet body and fastening system is shown in FIGS. 17-22. In this embodiment, collet body 120 includes many of the fundamental elements and features found in collet body 20, e.g., first wall portion 132, protruding portion 134, fingers 136, secondary slots 138, mid body portion 150 (in this embodiment, the mid body portion merges into the first wall portion but still separates the fingers from the second end), and internal threads 164. However rather than having flared hex as did collet body 20, flared flange 166 is used, which includes beveled surface 170.

Rather than relying upon flared hex or other similar structure associated with second end 160 to provide a means for preventing rotation, collet body 120 relies upon the nature of aperture 174 and rectilinear faces 146 of first wall portion 132 to counteract rotational forces that would be encountered during application of torque to collet body 120 by stud 80 during rotation of the same. This approach represents an additional means for preventing rotation of the collet body during rotation of the stud.

Preferably, the nature of aperture 174 is at least partially rectilinear or is asymmetrical as opposed to circular, i.e., at least one portion and preferably four portions of the aperture are linear or the aperture is asymmetrical about the aperture axis. From an operational point of view, the objective is to permit axial translation while arresting axial rotation of the collet body in reference to the objects to be attached. Thus, the axial translation profile of the collet body that is in contact with the sleeve insert or similar structure should be constant while the radial profile in the pertinent area of the collet body should not be constant.

In the event that it is not possible to create a rectilinear or asymmetrical aperture in any of the objects to be attached, use of an auxiliary structure such as clip 110 may be desirable. Clip 110 is best shown in FIGS. 21 and 22, and includes rectilinear aperture 112 in addition to proximal aperture 114 (those persons skilled in the art will appreciate that the proximal aperture may have rectilinear properties in addition to or in substitution of the distal aperture rectilinear properties). For selected applications, it may be desirable to employ a partial clip, such as clip 110', which is shown in FIG. 20. In either instance, the clip will transfer torque forces from the collet body to the one or more objects to be attached.

Heretofore all collet bodies have been illustrated as including primary slot 26 or 126. While these slots are preferably parallel to the collet body axis, any primary slot can be skew or helical with respect thereto. Moreover, inclusion of such a slot is not necessary to the operation of the invention. Thus, FIGS. 8-12 show an alternative to these collet bodies in the form of collet body 220. As with collet body 120, collet body 220 is preferably formed from a metal. Collet body 220 includes elements and portions similar to that of collet bodies 20 and 120, namely, first wall portion 232, protruding portion 234, fingers 236, secondary slots 238, second wall portion 262, and internal threads 264 (in this embodiment, a mid body portion does exist, but is nominal and identification thereof is not relevant to this discussion). Rather than having a flared hex to prevent rotation of the collet during installation, as did collet body 20, faceted flange 266 is used to create rectilinear surfaces. These rectilinear surfaces (or those portions between the surfaces) function similarly to flared hex 66 or rectilinear faces 146 in that they are locatable in longitudinal features of a suitably formed sleeve insert, thereby providing a means for counteracting rotation of the collet body when subjected to torque. As illustrated, sleeve insert 90 has the capacity to accept either collet body 20, which has flared hex 66, or collet body 220, which has faceted flange 266.

In some instances, it may be desirable to minimize the diameter of the distal object's aperture to achieve a close fit with the first end of the collet body. Alternatively or in addition, it may be desirable to distribute the compression forces imposed by protruding portion 34 (also 134 and 234 depending upon the collet body in use) on the distal object at its aperture. FIGS. 23 to 26 illustrate collet body 220 of FIG. 8 wherein a split washer 120 formed from a resilient material is captively held between faceted flange 266 and protruding portion 234. While split washer 120 is shown in conjunction with faceted flange 266, this aspect of collet body 220 need not be present although it is considered desirable.

Figure 10:
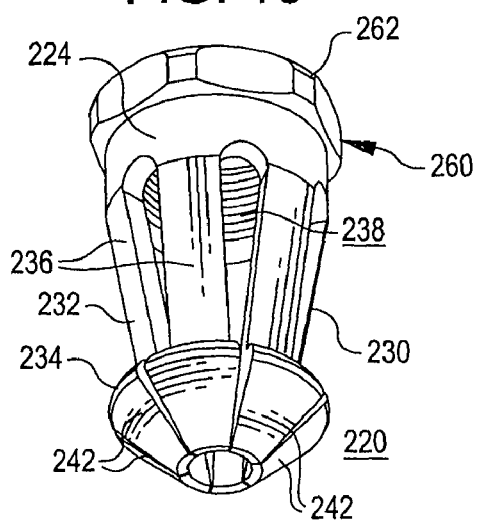
FIG. 10 is the alternative perspective view of the second embodiment of FIG. 9 but wherein the fingers are shown in a converging or progressively decreasing radial profile state.
Figure 11:
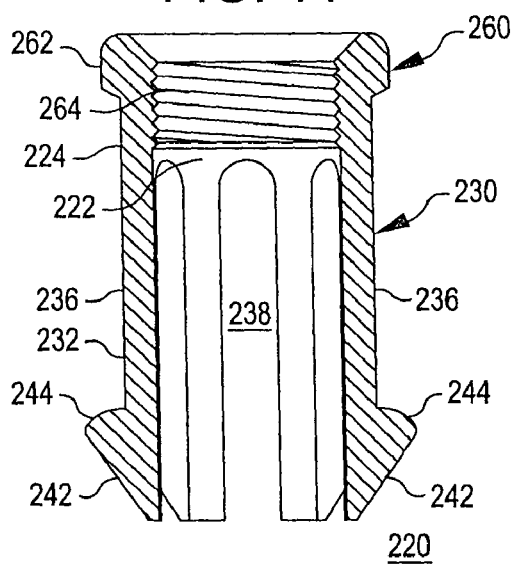
FIG. 11 is a cross sectional elevation view of the second embodiment of FIGS. 8 and 9.
Figure 12:
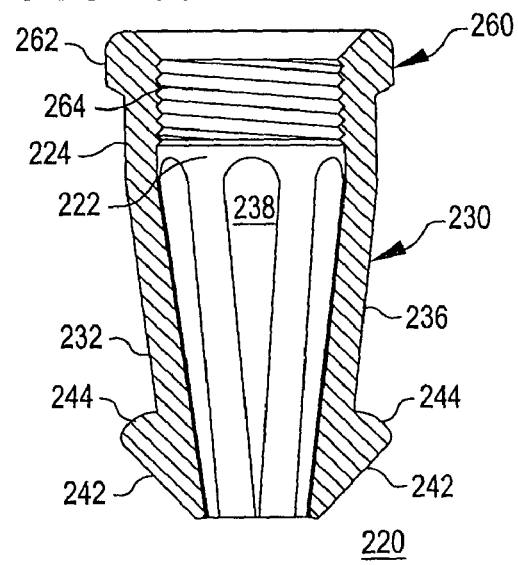
FIG. 12 is a cross sectional elevation view of the second embodiment of FIG. 10.

Split washer 120 operates as a radial constriction element so that prior to use, the combination resembles FIG. 10 wherein fingers 236 are highly convergent. As shown therein, end segments 122 and 124 are highly overlapped, thus causing split washer 120 to have a very small diameter. In this manner, fingers 236 are caused to significantly radially constrict. The degree of desired constriction or convergence is determined by the diameter of the apertures present in the pieces to be attached and the outer diameter of the split washer. Upon insertion and expansion, collet body 220 and split washer 120 assume the geometry shown in FIGS. 25 and 26. There, collet body 220 is substantially cylindrical, and end segments 122 and 124 of split washer 120 are slightly displaced and out of plane until compressed between distal panel 76' and protruding portion 234. Thus, spit washer 120 acts as a thrust washer to uniformly distribute point loads created by protruding portions 234 when axially compressing against distal panel 76'. Moreover, should the primary anti-rotation feature fail during high-torque imposed compression of the panels, spit washer 120 may also function as a secondary anti-rotation means.

With respect to the foregoing embodiments, and depending upon design considerations and other factors described herein, the first wall portion of any collet body, which comprises the fingers, can have the following characteristic: converging or diverging with respect to the collet body axis (i.e., have a decreasing progressive radial profile or an increasing progressive radial profile), or parallel to the collet body axis (i.e., a nominal state).

In embodiments wherein the fingers are in a converging state prior to use, i.e., the progressing radial profile of the first wall portion is decreasing towards the first end, the first end is inserted through the apertures of the objects to be fastened so that the annular protruding portion clears the distal object aperture after insertion. The fingers are radially expanded such as by insertion of a stud to create the desired fit between the collet body and the objects. It should be noted that such a collet body will not self-retain in the several apertures without the fingers undergoing sufficient radial expansion to maintain contact between at least the protruding portion and the distal object aperture. Moreover, if the collet body is constructed from a memory material, the radial expansion must be maintained by an ancillary structure, such as a stud, lest the fingers and protruding portion return to a converging state.

In embodiments wherein the fingers are in a diverging state prior to use, i.e., the progressing radial profile of the first wall portion is increasing towards the first end, or they are in a nominal state prior to use, i.e., the progressing radial profile of the first wall portion is constant, then the first end is radially constricted to permit the insertion thereof through the apertures of the objects to be fastened so that the annular protruding portion clears the distal object aperture after insertion. If the collet body is constructed from a memory material, the fingers will return to their original divergent or nominal state, and thereby act to self-retain the collet body in the object apertures. However if the collet body is constructed from a malleable material, it will be necessary to re-establish a divergent or nominal finger profile such as by insertion of a stud.

In each previously described embodiments, the protruding portion has operated to assist in providing compression forces to the distal object that counteract those introduced via the stud head and/or flared tabs/flange on the proximal object. Depending upon design considerations, the leading face and trailing face (shown in the various Figures as leading face 42, 142 or 242, and trailing face 44, 144, or 244) may take various geometric forms and relationships to one another. For example, the more acute the angle of the leading face relative to the collet body axis, the more easily the collet body will traverse through the object orifices. The more acute the angle of the trailing face relative to the collet body axis, the more easily the collet body can be removed from the several object apertures if desired (incidentally, a chamfer formed at lower lip 108 of sleeve insert 90 will also facilitate such removal). If the trailing face is normal to the axis, then compression loads thereat are most favorably distributed into the distal object. Lastly, if the trailing face is obtuse to the axis (i.e., its slope approximates that of the leading face), it acts as a barb to engage the distal object and makes removing the collet body more difficult.

What is claimed:

1. An expandable collet anchor system comprising:
a collet body, for use with at least one work piece defining a hole, and having a longitudinal axis, the collet body comprising:
 a first end defining a generally circular opening;
 a first wall portion adjacent to the first end, the first wall portion having an interior surface, an exterior surface, a progressing radial profile and defining at least two secondary slots extending longitudinally from the first end to thereby create at least two fingers having a distal end at the first end;
 a second end including a head at or proximate thereto having a maximum external diameter, the second end defining a generally circular opening;
 a second wall portion adjacent to the second end, the second wall portion having an interior surface and an exterior surface;
 an annular protrusion extending from the exterior surface of the first wall portion, and having a leading face and a trailing face;
 an auxiliary structure;
 a collet body anti-rotation means for engaging with the auxiliary structure, the auxiliary structure defining a first opening at a first side extending to a second opening at a second side, and having an internal surface geometry between the two openings adapted to substantially translationally receive the collet body through the first opening, without deformation of the collet body anti-rotation means, and operably function with the collet body anti-rotation means to prevent substantial rotation of the collet body therein, wherein the progressing radial profile is one of converging or becomes converging upon radial constriction of the at least two fingers such that the annular protrusion has a maximum external diameter the same as or less than any work piece hole minimum internal diameter; and
a stud including a stud head and a body, the body sized to fit through the generally circular opening of the collet body second end, wherein the auxiliary structure is a sleeve insert having a base at the second opening and an orthogonally oriented cylinder extending there from, and terminating at a rim portion at the first opening.

2. An expandable collet anchor system comprising:
a collet body, for use with at least one work piece defining a hole, and having a longitudinal axis, the collet body comprising:
 a first end defining a generally circular opening;
 a first wall portion adjacent to the first end, the first wall portion having an interior surface, an exterior surface, a progressing radial profile and defining at least two secondary slots extending longitudinally from the first end to thereby create at least two fingers having a distal end at the first end;
 a second end including a head at or proximate thereto having a maximum external diameter, the second end defining a generally circular opening;
 a second wall portion adjacent to the second end, the second wall portion having an interior surface and an exterior surface;
 an annular protrusion extending from the exterior surface of the first wall portion, and having a leading face and a trailing face;
 an auxiliary structure;
 a collet body anti-rotation means for engaging with the auxiliary structure, the auxiliary structure defining a first opening at a first side extending to a second opening at a second side, and having an internal surface geometry between the two openings adapted to substantially translationally receive the collet body through the first opening, without deformation of the collet body anti-rotation means, and operably function with the collet body anti-rotation means to prevent substantial rotation of the collet body therein, wherein the progressing radial profile is one of converging or becomes converging upon radial constriction of the at least two fingers such that the annular protrusion has a maximum external diameter the same as or less than any work piece hole minimum internal diameter; and a stud including a stud head and a body, the body sized to fit through the generally circular opening of the collet body second end, wherein the auxiliary structure is a sleeve insert having a cylinder with a rim portion at the first opening and a flange portion at the second opening extending radially outwardly there from, and wherein the internal surface geometry further comprises at least one longitudinal feature complementary to the collet body anti-rotation means and is one of a linear recess, a linear protrusion or a facet.

3. An expandable collet anchor system comprising:

a collet body, for use with at least one work piece defining a hole, and having a longitudinal axis, the collet body comprising:

a first end defining a generally circular opening;

a first wall portion adjacent to the first end, the first wall portion having an interior surface, an exterior surface, a progressing radial profile and defining at least two secondary slots extending longitudinally from the first end to thereby create at least two fingers having a distal end at the first end;

a second end including a head at or proximate thereto having a maximum external diameter, the second end defining a generally circular opening;

a second wall portion adjacent to the second end, the second wall portion having an interior surface and an exterior surface;

an annular protrusion extending from the exterior surface of the first wall portion, and having a leading face and a trailing face;

an auxiliary structure;

a collet body anti-rotation means for engaging with the auxiliary structure, the auxiliary structure defining a first opening at a first side extending to a second opening at a second side, and having an internal surface geometry between the two openings adapted to substantially translationally receive the collet body through the first opening, without deformation of the collet body anti-rotation means, and operably function with the collet body anti-rotation means to prevent substantial rotation of the collet body therein, wherein the progressing radial profile is one of converging or becomes converging upon radial constriction of the at least two fingers such that the annular protrusion has a maximum external diameter the same as or less than any work piece hole minimum internal diameter; and a stud including a stud head and a body, the body sized to fit through the generally circular opening of the collet body second end, wherein the auxiliary structure is a sleeve insert having a base at the second opening and an orthogonally oriented cylinder extending there from and terminating at a rim portion at the first opening wherein the internal surface geometry further comprises at least one longitudinal feature complementary to the collet body anti-rotation means and is one of a linear recess, a linear protrusion or a facet.

4. An expandable collet anchor system comprising:

a collet body, for use with at least one work piece defining a hole, and having a longitudinal axis, the collet body comprising:

a first end defining a generally circular opening;

a first wall portion adjacent to the first end, the first wall portion having an interior surface, an exterior surface, a progressing radial profile and defining at least two secondary slots extending longitudinally from the first end to thereby create at least two fingers having a distal end at the first end;

a second end including a head at or proximate thereto having a maximum external diameter, the second end defining a generally circular opening;

a second wall portion adjacent to the second end, the second wall portion having an interior surface and an exterior surface;

an annular protrusion extending from the exterior surface of the first wall portion, and having a leading face and a trailing face;

an auxiliary structure;

a collet body anti-rotation means for engaging with the auxiliary structure, the auxiliary structure defining a first opening at a first side extending to a second opening at a second side, and having an internal surface geometry between the two openings adapted to substantially translationally receive the collet body through the first opening, without deformation of the collet body anti-rotation means, and operably function with the collet body anti-rotation means to prevent substantial rotation of the collet body therein, wherein the progressing radial profile is one of converging or becomes converging upon radial constriction of the at least two fingers such that the annular protrusion has a maximum external diameter the same as or less than any work piece hole minimum internal diameter; and a stud including a stud head and a body, the body sized to fit through the generally circular opening of the collet body second end, wherein the auxiliary structure is a sleeve insert having a base at the second opening and an orthogonally oriented cylinder extending there from and terminating at a rim portion comprising an inwardly extending lip, at the first opening.

5. The expandable collet anchor system of any claim 1, 2, 3 or 4 wherein the stud comprises external threads and the collet body comprises complementary internal threads.

6. The expandable collet anchor system of any claim 1, 2, 3 or 4 wherein the stud comprises external threads and the sleeve insert is threadless.

7. The expandable collet anchor system of any claim 1, 2, 3 or 4 wherein the sleeve insert has an overall length less than or equal to the sum of all work piece sectional thicknesses.

8. The expandable collet anchor system of any claim 1, 2, 3 or 4 wherein the sleeve insert has a length that is less than or equal to a longitudinal length of the collet body.

9. The expandable collet anchor system of any claim 1, 2, 3 or 4 wherein the collet body anti-rotation means is formed on the exterior surface at one or both of the first end or the second end.

10. The expandable collet anchor system of any claim 1, 2, 3 or 4 wherein the collet body anti-rotation means is formed at the head thereof.

11. The expandable collet anchor system of any claim 1, 2, 3 or 4 wherein during use the collet body is first introduced into the auxiliary structure through the first opening thereof and further comprising a second part of a collet body anti-translation means at or proximate to the second opening of the sleeve insert.

* * * * *